United States Patent [19]
Hill

[11] Patent Number: 5,963,350
[45] Date of Patent: Oct. 5, 1999

[54] OPTICAL TELECOMMUNICATIONS NETWORK

[75] Inventor: Alan Michael Hill, Suffolk, United Kingdom

[73] Assignee: British Telecommunications public limited company, London, United Kingdom

[21] Appl. No.: 08/714,182

[22] PCT Filed: Mar. 29, 1995

[86] PCT No.: PCT/GB95/00726

§ 371 Date: Sep. 27, 1996

§ 102(e) Date: Sep. 27, 1996

[87] PCT Pub. No.: WO95/26592

PCT Pub. Date: Oct. 5, 1995

[30] Foreign Application Priority Data

Mar. 29, 1994 [GB] United Kingdom ................ 9406265
Jun. 29, 1994 [GB] United Kingdom ................ 9413081

[51] Int. Cl.$^6$ ................................................ H04B 10/20
[52] U.S. Cl. ................... 359/127; 359/129; 359/137; 359/167
[58] Field of Search .................... 359/123, 117, 359/120, 121, 115, 124, 125, 137, 167

[56] References Cited

U.S. PATENT DOCUMENTS

| | | | |
|---|---|---|---|
| 5,241,409 | 8/1993 | Hill et al. | 359/128 |
| 5,321,541 | 6/1994 | Cohen | 359/110 |
| 5,373,386 | 12/1994 | Bolze | 359/125 |
| 5,479,286 | 12/1995 | Staller et al. | 359/125 |
| 5,528,596 | 6/1996 | Fisher et al. | 359/118 |
| 5,548,432 | 8/1996 | Clarke et al. | 359/137 |
| 5,559,624 | 9/1996 | Darcie et al. | 359/118 |
| 5,559,625 | 9/1996 | Smith et al. | 359/118 |
| 5,742,414 | 4/1998 | Frigo et al. | 359/125 |

OTHER PUBLICATIONS

Acampora, A.S., "A High Capacity Metropolitan Area Network Using Lightwave, Transmission and Time–Multiplex Switching", IEEE Transactions On Communications, vol. 38, No. 10, Oct. 1990, New York, US, pp. 1761–1770, XP176871.

K–W Cheung, Acoustooptic Tunable Filters in Narrowband WDM Networks: System Issues and Network Applications, IEEE Journal On Selected Areas in Communication, vol. 8, No. 6, Aug. 1990, New York, US, pp. 1015–1025, XP208595.

Sharony et al., Wavelength Rearrangeable and Strictly Non-blocking Networks, and Electronics Letters, vol. 20, No. 6, Mar. 12, 1992, Stevenage GB, pp. 536–537, XP284.

Patent Abstracts of Japan, vol. 16, No. 197 (P–1350), May 12, 1992, & JP, A, 40 030 129, Feb. 3, 1992.

Alexander et al., "Precompetitive Consortium on Wide–band All Optical Networks", Journal of Lightwave Technology, vol. 11, No. 5/6, May 1993, New York, US, pp. 714–732 XP396704.

Cochrane, et al., Eradicating the Central Office with Coherent Optical Technology, Proceedings, 1988, pp. 59–62, Zurich CH, XP216002.

Sharony et al., The Wavelength Dilation Concept in Lightwave Networks—Implementation and System Considerations, Journal of Lightwave Technology, Vol. 11, No. 5/6, May 1993, New York, US, pp. 900–907, XP396719.

*Primary Examiner*—Edward Lefkowitz
*Attorney, Agent, or Firm*—Nixon & Vanderhye P.C.

[57] ABSTRACT

An optical telecommunication system includes a number of transparent passive optical networks (TONs). Each TON connects a respective group of terminals and the head end of each TON is connected to a common central switching node. Each terminal includes selecting a wavelength/time channel for forming a connection with another terminal within the respective TON or within another TON. The central switching node comprises an optical spatial/wavelength switch arranged to provide switched connections between subscribers connected to different TONs.

13 Claims, 7 Drawing Sheets

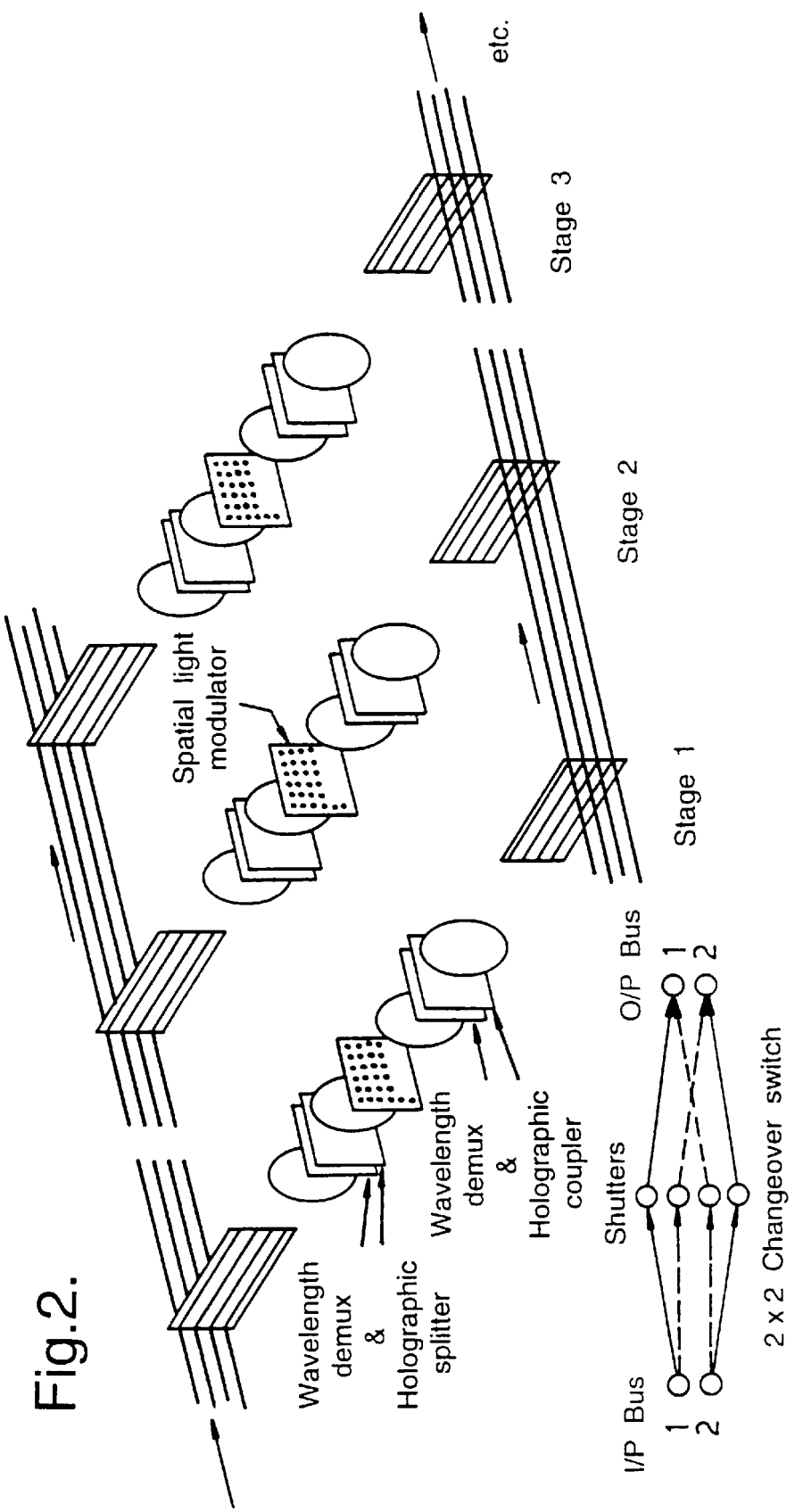

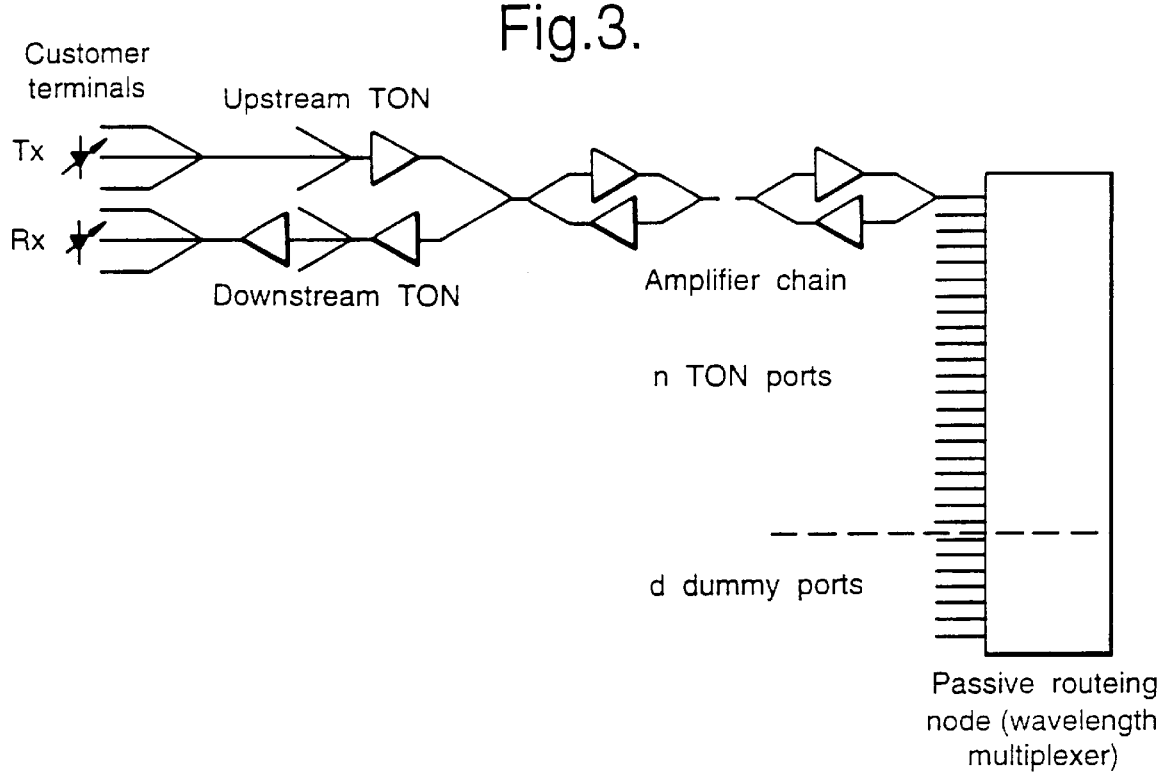
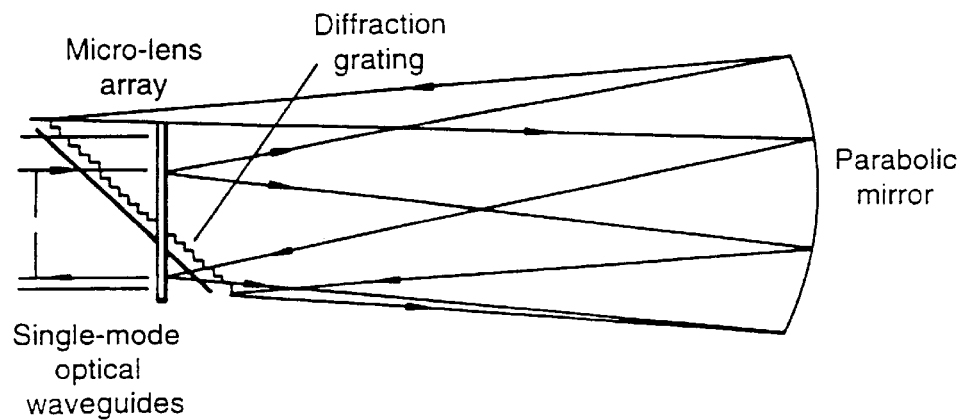

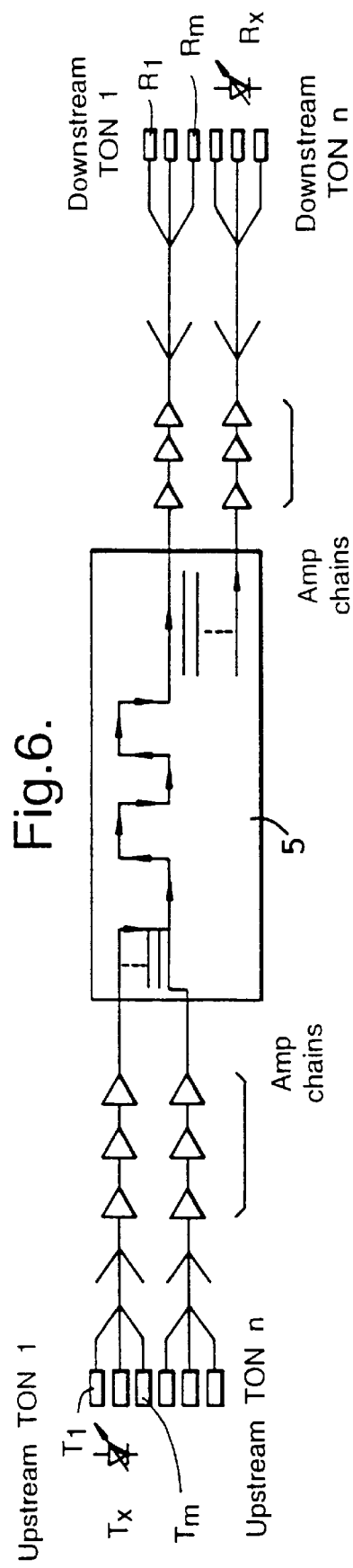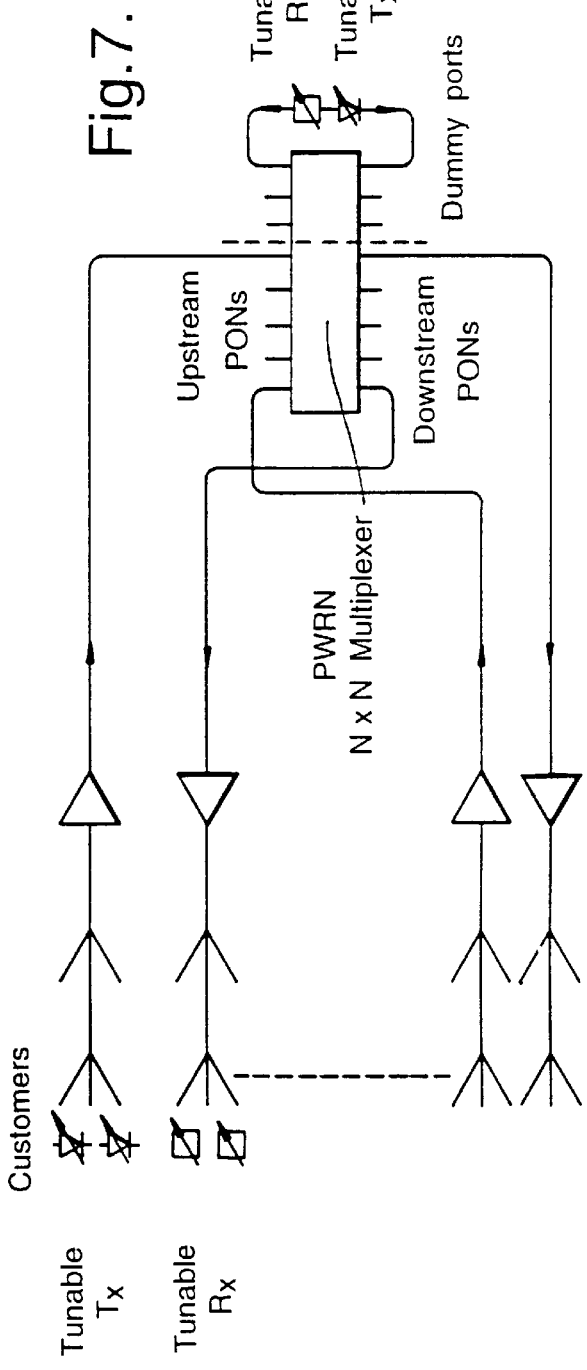

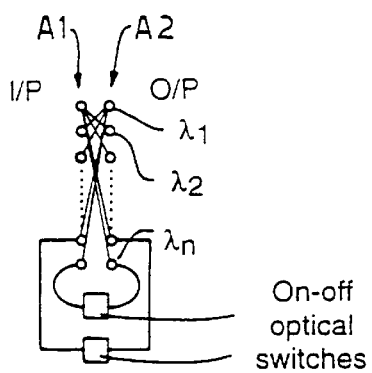
Fig. 11(cii).

OPTICAL TELECOMMUNICATIONS NETWORK

BACKGROUND TO THE INVENTION

1. Field of the Invention

The present invention relates to an optical telecommunications network and to switching structures suitable for use in such a network.

2. Related Art

Optical transmission systems potentially offer a basis for telecommunications networks of very high capacity. It is envisaged that this capacity will be used to provide connections for large numbers of systems to high bandwidth services such as high bit rate data communications, video on demand VoD or video telephony. However, in practice when it comes to realising such a high capacity network, the design of appropriate switching technologies is found to be a major constraint on the performance of the network. With current technologies, the switching structures are electronic (e.g. ATM switches) and are therefore limited to capacities considerably lower than those which can be achieved in the optical domain. Control and management of the switching function also provides further difficulties and there is a need to minimise software costs for call processing, network intelligence, network management and service management.

In order to minimise the use of active switches and the associated constraints discussed above, it has been proposed to use passive optical networks PONs. However hitherto, such PONs have been used for multiplexing and consolidation of access traffic to a local switch node with customer to customer connections still being provided by switching centrally at the nodes.

SUMMARY OF THE INVENTION

According to a first aspect of the present invention there is provided an optical telecommunications system comprising a plurality of transparent passive optical networks (TONs) each providing connections to a plurality of terminals, and the head-ends of the TONs being connected to a common central switching node, characterised in that each terminal includes means for selecting a wavelength channel, for forming a connection with another subscriber station within the respective TON, or within another of the plurality TONs and in that the central switching node includes an optical spatial/wavelength switch arranged to provide connections between subscribers connected to different TONs.

The present invention uses amplified PONs (Transparent PONs or 'TONs') to provide a network with sufficient capacity for distributed switching to be carried out. Wavelength channels and, preferably, time slots are allotted dynamically to individual customer-customer connections. The use of time slots is preferred, but may be dispensed with where a network is operating at relatively low capacity. This distributed switching function combined with spatial cross-switching at a node connecting a plurality of TONs provides a system capable of covering an entire regional or national area.

Preferably the switch is a time- and wavelength-shared rearrangable space switch, more preferably comprising a plurality of stages connected to an optical bus. A rearrangable switch is one which does not inherently provide fully non-blocking cross-connection, but which functions as a non-blocking switch by re-assigning e.g. space or wavelength channels to on-going connections when necessary.

Preferably each of the plurality of stages includes an array of 2×2 optical changeover switches. Preferably said array of changeover switches is provided by a spatial light modulator SLM array arranged between a wavelength demultiplexer and a wavelength multiplexer and coupler/splitters. In embodiments of this aspect of the invention switching is performed in a distributed manner, with customer terminals dynamically allocated their transmitter and receiver wavelength channels and time-slots, under centralised processor control. A pair of sending and receiving customer terminals are allocated a common wavelength and time-slot for the duration of their connection. Such distributed channel allocation is used in combination with a central switch node, to connect the appropriate spatial fibres at the correct time and wavelength. The switch node employs spatial light modulators, in such a way that many wavelength channels can be simultaneously selected and routed to desired output ports. A further embodiment uses the SLMs in a MONET-like structure configured as a time-and wavelength-shared multi-stage rearrangeable space switch. The combination of customer or terminal wavelength and time-slot agility, with spatial light modulators in a MONET bus architecture, produces a very high capacity switched network that can be constructed with relatively little switching hardware. The multi-stage rearrangeable switching network structure reduces the required switching hardware even further.

According to a second aspect of the present invention there is provided an optical telecommunications system comprising a plurality of TONs, each TON connecting a plurality of terminals characterised in that each terminal includes means for selecting a wavelength channel to establish a connection with a selected other of the terminals and in that the plurality of TONs are connected at their head-ends to a common passive routing node.

Preferably each terminal includes means for selecting a time slot which in combination with the selected wavelength defines a channel for the connection.

The second aspect of the present invention eliminates active switching nodes entirely from the network and relies upon a passive routing node for connections between different TONs.

Preferably the passive node comprises a wavelength multiplexer arranged to cross-connect the plurality of TONs connected to it. Preferably at least some of the ports of the node are connected to a respective set of wavelength converters, a signal on an incoming wavelength from a TON directed to one of the said ports being converted to a different wavelength and coupled back to the same TON.

Using a simple passive wavelength multiplexer, there is only one wavelength on which each TON could output a signal which could be routed back to the same TON. However, typically with telephony traffic, perhaps 30–70% of the traffic from an individual TON may wish to remain within the same geographical area and so will need routing back to the same TON. This aspect of the present invention overcomes this problem by the use of dummy ports which for routing within a TON, may include a mirror to reflect back a signal to the TON. Others of the dummy ports include wavelength converters for routing to other TONs of a signal from one TON. Wavelength conversion may be achieved by the use of wavelength converters in the form of advanced all-optical devices, or simply by using the equivalent of a customer terminal to select a wavelength channel, opto-electronically convert the signal, and re-transmit the signal at a new wavelength.

The preferred embodiment of this aspect applies the wavelength-routing technique to the traffic requirements between any pair of PONs. It does so with the use of a passive wavelength-routing node (PWRN), in the form of a simple wavelength-division-multiplexer. This device possesses N×N connectivity, in that each PON can be connected simultaneously to all other PONs at N different wavelengths. Because there is only one wavelength available between any given pair or ports, a set of dummy ports is required, to couple more than one wavelength simultaneously between them. Two types of dummy port are possible. To couple multiple wavelengths between the same port (i.e. traffic remaining within the same PON), dummy ports need only provide a simple reflection in the form of a mirror. To couple multiple wavelengths between different ports (i.e. for traffic between on PON and another), dummy ports must have the ability to convert incoming wavelengths to different outgoing wavelengths. This could be in the form of advanced wavelength converters, or simply by using receivers, electrical regeneration and tunable transmitters like the main PON ports. The mirrors provide a form of switch-node by-pass for traffic remaining within a PON, a avoiding the need for wavelength conversion. Although this structure is topologically equivalent to a three-stage, wavelength/wavelength/wavelength switch architecture, the use of a single wavelength-division-multiplexer greatly reduces the number of waveguide interconnections that would be needed in that equivalent architecture. It also reduces greatly the total number of multiplexer ports required, because the three stages of multiplexers are effectively incorporated all in one multiplexing device. These reductions offer substantial cost savings. Furthermore, by carrying out wavelength conversions associated only with PON-PON traffic levels exceeding one wavelength's capacity, and by using mirrored ports for traffic remaining within a PON, it should be possible to reduce greatly the number of wavelength conversions required, according to the traffic statistics.

In a conventional, three-stage, wavelength/wavelength/wavelength architecture, the wavelength converters may have to convert different upstream wavelengths from different upstream PONs to the same wavelength. That is, pulse streams must be interleaved from different upstream PONs. This produces additional technical difficulties; ranging between different PONs and additional computations for channel allocation. The invention avoids or reduces the need for these additional tasks, by allowing direct connections between upstream and downstream PONs for small capacities up to one wavelength's worth. With relatively large numbers of PON ports, the traffic levels between specific pairs of different PONs may be relatively small, possibly not exceeding the capacity of a single wavelength channel, and this can be handles without the need for wavelength conversion.

The present invention also encompasses methods of operating systems in accordance with the first and second aspects.

BRIEF DESCRIPTION OF THE DRAWINGS

Examples of systems embodying the different aspects of the present invention will now be described in further detail, by way of example only, with reference to the accompanying drawings in which:

FIG. 2 is a schematic of a time and wavelength-shared space switch;

FIG. 3 is a schematic of a broadband national network employing a single sided passive wavelength routing node;

FIG. 5 shows a wavelength multiplexer for use in the wavelength routing node of FIG. 3;

FIG. 6 shows a national optical network incorporating the switch of FIG. 2;

FIG. 7 shows an alternative network configuration;

DETAILED DESCRIPTION OF EXEMPLARY EMBODIMENTS

An optical telecommunication system comprises a plurality of transparent passive optical networks TON1, TON2 ... TONn (FIG. 6). The TONs are connected at their downstream ends to a plurality of terminals, each terminal including a transmit stage $T_1 ... T_m$ arranged to select a time and wavelength slot for outgoing signals, and a receive stage $R_1 ... R_m$ arranged to receive signals in a time and wavelength slot characteristic of the particular customer terminal. At their upstream ends the TONs are connected in common to a space switch S.

The terminals may be located at customer premises, or may be employed at an intermediate network station higher up in the network where customer traffic has already been aggregated and multiplexed. For example the terminal may be located at the head end or at street-cabinet locations of a narrow band or broad band PON system. In either case, the terminal includes in its transmit stage T1 ... Tn a tunable wavelength source. In this example, the source is a tunable laser which may be, for example, a tunable DBR (distributed Bragg reflector) or a grating-assisted vertical coupler device. Alternatively, the tunable source may be in the form of an amplifier and modulator such as that demonstrated in the RACE II "MUNDI" project (D. J. Pratt et al "Tunable Source Options for Race-2070 Project (Mundi)" cost 240 workshop, Marcoussis, France 25th Oct. 1993). This design uses a mechanically tunable optical filter and semiconductor amplifier/modulator to select a required wavelength channel from a comb of reference wavelengths broadcast from a central location to a large number of customer terminals. This approach relaxes the tuning accuracy required at the terminal. For multi-point connections, an electrically tunable device is preferable to provide fast tuning between wavelengths.

Each terminal is allocated time-slots and wavelength channels under the control of one or more central processors. The same central processor controls the settings in the central space switch. Apart from the possible use of buffer memories in the terminals, there are no memory elements in the optical switch node. Therefore, the time switching of wavelength channels and SLM pixels in the switch must be performed as a circuit-switched operation, using conventional path set-up algorithms for circuit switching in multi-stage switching networks such as Clos networks and permutation networks using a central control processor.

Although computation of such algorithms can not be distributed out to the PONs, because of the long time delays that would be incurred in what are essentially time-sequential call set-up algorithms, distributed processing between multiple processors can nonetheless be employed at or close to the switch node.

Figure 8:
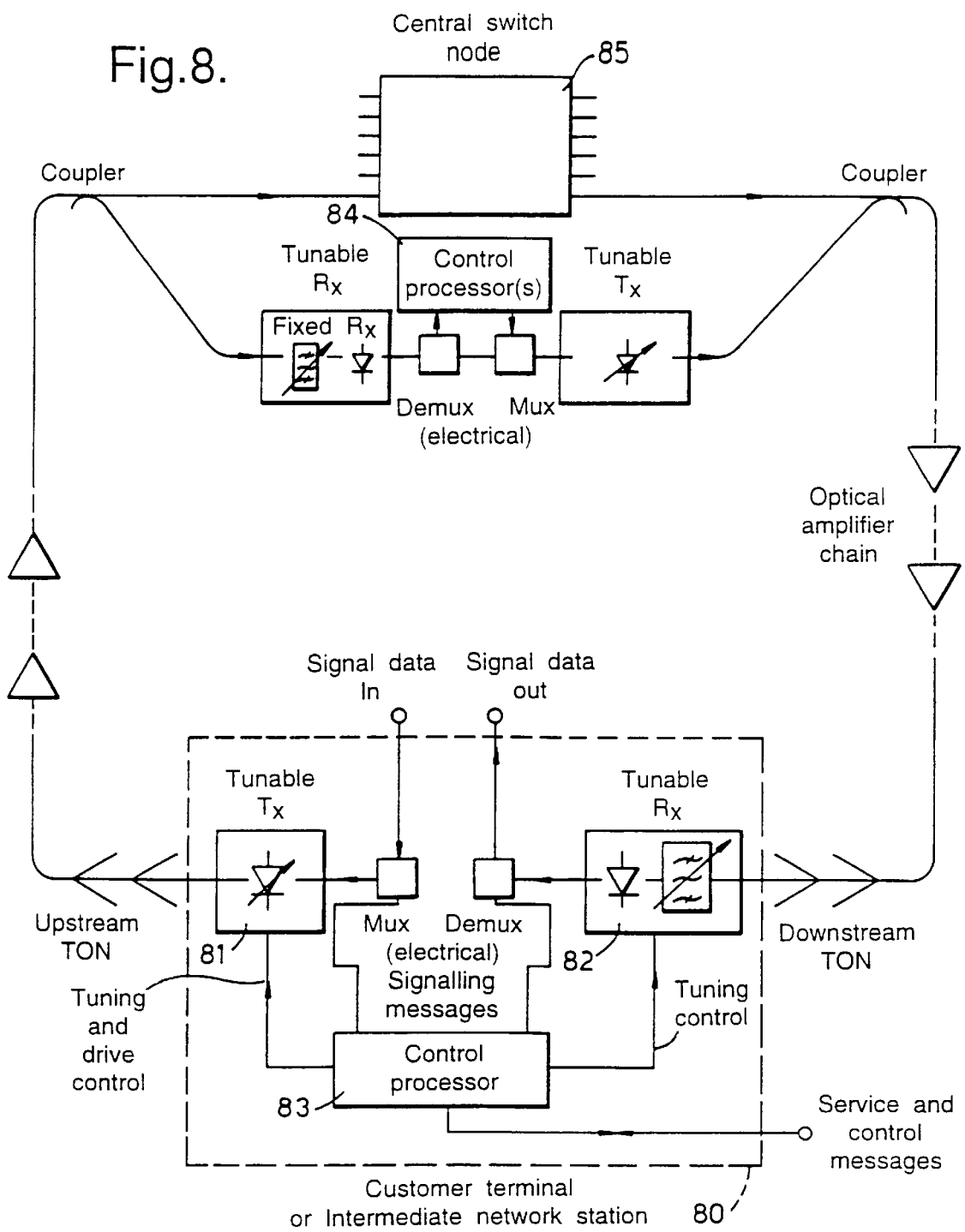
FIG. 8 is a schematic illustrating structures for control and signalling in a terminal and at a central switch.

Control signals between the terminals and the central switch node are transported over signalling channels. These may be provided in several possible ways. For example, a sub-set of the time and wavelength channels could be allocated to signalling. FIG. 8 shows a terminal configured to function in this fashion. The terminals tunable transmitter 81 and receiver 82 are controlled by a processor 83 which communicates with the central processor 84 associated with the switch node by multiplexing signalling traffic with the customer signal data over the optical channels, and selects time and wavelength channels for a connection accordingly.

A major issue is the disparity and variability of pulse propagation times in such an all-optical end-to-end network. Because there is no intermediate electronic retiming between the terminal, spectral dispersion and thermal effects in the fibre can cause large variations. Maximum summer-winter variations in propagation delay in the UK could be as large as 5 microsec over a 1,000 km fibre link. But thermal variations occur relatively slowly, because fibres are buried underground. Ranging protocols should therefore be capable of dealing with thermal variations of propagation delay. Spectral dispersion is more difficult to deal with. For example, the range of propagation times across the 30 nm spectral width of the erbium amplifier could be just 25.5 nsec for a 50 km end-to-end connection via the switch node. But for customers 1,000 km apart, the variation would be 0.5 microsec. For a point-to-point connection between terminals, which involves no other terminals for the duration of the connection, such variations could be acceptably accommodated by using variable delay lines at the terminals (i.e. using ranging protocols again). But for a multi-point connection "simultaneously" involving more than one terminal, changes of wavelength between time-slots would require delay-line variation, which could cause blocking problems by preventing access to certain time-slots. It may be preferable therefore, for synchronisation purposes, to employ long time-slots and long guard-bands between them, say of the order of 1 microsec. This would need buffer memories at the terminals, to clock out stored data in "bursts", i.e. in packets or cells. ATM cells would be feasible, but with additional time guard-bands between the cells, resulting in a modified ATM structure. This may also result in higher bit-rates to compensate for reduced transmission efficiency due to the guard-bands. To accommodate variations in pulse arrival times at different wavelengths or from different TONs, the terminals must employ burst-mode receivers. These will require additional synchronisation bits at the start of each packet or cell, which would also modify a basic ATM structure. (NB ATM is only a useful basis for cell format. Its asynchronous nature cannot be used as a mode of switching, because the lack of memory elements in the optical path requires circuit switching to be employed). All terminals and the central switch must have their time-slots sufficiently well synchronised. But with time slots perhaps lasting a few microsecs, this could also be relatively "sloppy", perhaps even to the same order of around 1 microsec (which would also add to the length of the time-slot).

The central space switch is a time-and wavelength-shared switch. Every optical waveguide or bus contains a set of wavelengths with time-shared traffic from customers in the upstream TONs. A central processor or processors control the allocation of time-slots, wavelength channels, and the spatial paths through the switch. The switch is optically transparent. The switching elements are spatial light modulator pixels (on-off gates or shutters). Suitable technologies may be MQW semi-conductor opto-electronic modulators, fast liquid crystals (yet to be demonstrated at suitable speeds), PLZT, electro-optic and magneto-optic materials, etc. Some technologies are better employed in reflection rather than transmission, as shown. This would simply result in a folded geometry, instead of the in-line imaging and dispersion optics shown in the diagram. The diagram shows a switch architecture that requires the smallest possible amount of hardware, by employing a multi-stage, rearrangeable network structure (permutation network), such as those of Waksman (A. Waksman, "A permutation network", J. Assoc. Computing Machinery vol. 15, 159–163 (1968)), Goldstein and Lelbholz (L. J. Goldstein and S. W. Leibholz, "On the synthesis of signal switching networks with transient blocking," IEEE Trans. Electron. Comput. vol. EC-16, 637–641 (1967), using 2×2 optical crosspoints as the switching elements. Other, less hardware-efficient structures could be employed. Every stage of switching uses its own optical imaging and dispersion system. These separate out the wavelength channels from each input waveguide or bus, using diffraction gratings, and switch a given wavelength from two input waveguides to two output waveguides (i.e. a 2×2 changeover switch). The 2×2 element is achieved by using 4 shutters in the SLM, in combination with bulk-optic splitters and couplers (fabricated holographically or by e-beam after computer generation of the required grating structure, or suitably replicated from such a master). The splitter provides two copies of each input waveguide at each wavelength, the shutters select which output waveguide is to receive the light, and the coupler allows light from either of two inputs to couple to an output waveguide or bus. Wavelength channels are also re-multiplexed using a diffraction grating. The output waveguides or buses then carry the remultiplexed wavelength channels to the next stage of switching.

The maximum possible split for each TON is limited primarily by the upstream capacity. A very large customer base can be served in the downstream direction. The possibility of broadcasting downstream from a single head-end to tens of millions of customers has been demonstrated over 5–7 km [2]. The experiment demonstrated the ability to deliver 40 Gbit/s capacity shared between 16 wavelength channels with 1 nm channel spacing. This is sufficient for, e.g., 256 uncompressed video channels, or alternatively as many as 8000 channels compressed to about 5 Mbit/s. In such a network, channel selection is carried out at the customer terminals using a combination of tuneable optical filters and electrical time-slot or ATM cell selection. With such capacities, a single CATV head-end can serve an entire nation. Computer models have shown that in principle, optical amplifiers with flattened wavelength response can support 400 or more wavelength channels across the erbium-doped fibre amplifier window, over 500 km with operation at 2.5 Gbit/s. The exact number depends on the amplifier spacing. This gives 1 Tbit/s downstream capacity, suitable for at least 200,000 compressed video channels. Non-linear effects within the fibre may reduce this slightly to around 0.5 Tbit/s [6]. Such capacity within a single TON could be used in various ways. For example, it would be sufficient to provide a near-demand video library service by staggered yet simultaneous broadcasting of multiple copies of thousands of film titles. This can be provided from a single server providing national coverage with no switching being necessary. Another possibility with so many channels, assuming sufficiently low penetration and high concentration, would be the introduction of a nationwide VoD service from a single national server.

If the same capacity is used for telephony, then this corresponds to about 13 million telephony channels, sufficient to support the entire telephony traffic of the UK with relatively low levels of concentration. If the same number of channels could be supported in the upstream direction, then the entire telephony service could be provided over a single looped-back TON without any central switch node whatsoever. However, the capability of TONs to accumulate traffic upstream from a large number of customers is severely limited, and is unable to match the split achievable in the downstream direction.

Upstream TONs

As noted above, the split and capacity of upstream TONs has hitherto provided a barrier towards moving towards a switchless network. Optical amplifiers impose major differences between upstream and downstream TONs due to quantum processes within the amplifiers that generate amplified spontaneous emission. There is a maximum number of customer fibres that can be coupled together in upstream amplified PONs beyond which further coupling of amplifier outputs unacceptably degrades the S/N ratio due to beat-noise between a signal and the amplified spontaneous emission. This severely limits the number of customers from whom traffic can be aggregated (the upstream split) and the corresponding capacity that can be supported.

Figure 1:
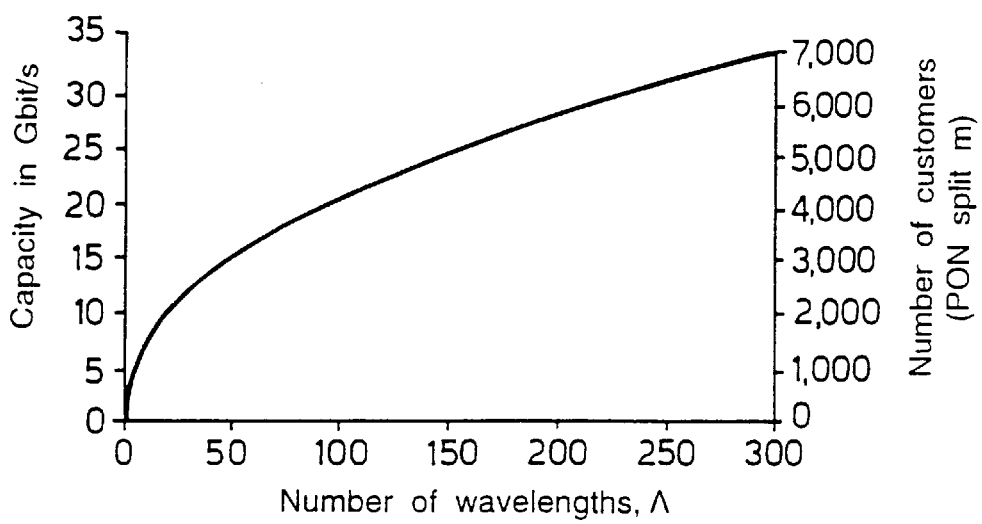
FIG. 1 is a graph illustrating PON capacity and split as a function of the number of wavelength channels.

FIG. 1 shows the achievable split and capacity for customers provided with a simultaneous average bit-rate of 4.8 Mbit/s—sufficient to support high-quality compressed video. With just one operating channel, the power budget is sufficient to combine 512 customers at an aggregate rate of 2.5 Gbit/s. But more customers may be supported if the aggregate bit-rate is reduced. The larger split reduces the power budget. For example, at 155 Mbit/s about 5,200 customer fibres can be combined. But to maintain the same calling rates and degrees of concentration, 160 wavelengths are needed to carry the additional capacity and to compensate for the reduction in bit-rate. The total TON capacity is ~25 Gbit/s at a bit-rate of 155 Mbit/s on each wavelength.

In the limiting case, if the aggregate bit-rate exactly equals the customer bit-rate, and every customer connection is allocated its own wavelength (i.e. no electrical multiplexing is employed) the TON split can support 94000 customers at 4.8 Mbit/s each, using the same number of wavelengths. Thus, while in this limiting case the upstream TON capacity can approach that of a downstream TON, the split cannot reach millions of customers (except possibly for very low narrow band telephony rates). However, it is not desirable to restrict all customers to a maximum bit-rate as low as 4.8 Mbit/s, since statistical multiplexing of higher-speed traffic is then not possible. Furthermore, wavelength densities as high as 94,000 distinct wavelengths are difficult to achieve. A more practical compromise may be provided by bit-rates of 155 Mbit/s and a 5,200-way split for the upstream TON.

From the above, it is clear that large capacities and splits can be obtained in upstream TONs through the use of high density wavelength division multiplexing (HDWDM) combined with relatively low operational bit-rates. The asymmetry between upstream and downstream TONs apparently provides a bar to fully distributed switching. The system illustrated in the Figures however is able to overcome this limitation by linking together a number of TONs at a common switching node which provides cross-switching to complement the wavelength and time switching functions distributed amongst the customer terminals.

At an operational bit-rate of 300 Mbits, using 208×208 pixel SLM's, the switch shown in FIG. 2, in combination with dynamic allocation of time and wavelength channels at customer terminals connected to the switch over TONs, and the assumptions of FIG. 1, is potentially capable of providing about 13 Tbit/s switched throughput. Each TON could serve up to around 2,900 customers, providing up to 611,00 customers on the network, each with about 21 Mbit/s continuous bit-rate.

The customer base could in fact be extended potentially to an entire nation using two different approaches. The first would be to use the terminals, containing the tunable transmitters and tunable receivers, as intermediate network stations, interfacing between multiplexed customer signals and the time-and wavelength-agile optical TON system. The customer side of the station could itself be a PON with electrical conversion at its head-end, or individual fibres to each customer, or even electrical cable to each customer (co-axial cable or copper or aluminium pairs). They would allocate time-slots and wavelength channels to aggregated customers' traffic. This could be achieved with different degrees of flexibility. With electronic switches and delay lines (e.g. shift registers) in the stations, the full channel allocation flexibility would be available. The second approach to extending the customer base would be to increase the split size of the TONs. A method of achieving this is disclosed in our European Patent Application "Passive Optical Network", filed on Mar. 3, 1995. This makes use of optical gates (on-off switches) to turn off the amplified spontaneous emission from an upstream PON amplifier, when there is no signal present during a time-slot. In this way the outputs of several optical amplifiers can be coupled together, to make a larger PON, without degrading the signal-to-noise ratio. In this way, a given PON capacity can be shared between more customers. Of course the optical gates must be synchronised with the time-slots. This basic method must be extended in the case of PON supporting WDM and dynamic wavelength allocation, so that gating is applied to every wavelength channel in every upstream PON subsequently to be coupled together. Two designs for gating the wavelengths are shown in FIG. 1. They differ by the order in which combining of PONs (coupling) and wavelength re-multiplexing are performed. FIGS. 11(A)–11(cii) show several multiplexer designs for use in FIG. 10b), in which the demultiplexing, re-multiplexing and gating functions could be integrated by varying degrees. They all work by using two passes through the same dispersive optical system, either through the use of refection back along the same optical path, or, as in FIG. 11c), by using two waveguide (e.g. fibre) arrays with the optical switches connected between pairs of input and output ports. Design b) is essentially the same as that disclosed in UK patent GB 2,152,317 B. Designs a and b could be planar-integrated in III–V semiconductor opto-electronics, possibly using either a curved grating "spectograph" or a "phasor" structure with semiconductor optical amplifier gates (possibly in array form on the substrate). Alternatively, bulk optics could provide the dispersion and imaging with opto-electronic semiconductor amplifiers/gates integrated in array form on one or more substrates.

By expanding the customer base 43-fold in this particular example, using either of the above approaches, an upstream PON can collect traffic from about 126,000 customers. Such a large customer base now allows the entire broadband traffic between, for example, 26,000,000 customers to be interconnected within a single switch node. This approach to increasing the split may also be used with a "switchless" network, such as that of FIG. 7.

The design for the space switch is based upon a back plane structure developed from the MONET configuration disclosed in reference [3]. Spatial light modulators SLMs are used as the switching devices. The switch functions as a time- and wavelength-shared multi-stage rearrangable space switch, in which each spatial light modulator array represents a stage of 2×2 optical switches. The relevant switch parameters are set out in table 1. The switch requires only 15 spatial light modulators to provide simultaneous connections between 2,600,000 customers at 5 Mbit/s each (i.e. 10:1 concentration). The total throughput is then 13 Tbit/s. This is equivalent in capacity to perhaps 120 ATM switches, each of 160 Gbit/s through put, using conventional structures for transport over the core network, and assuming that around 50% of the traffic from a node may wish to be connected to other nodes. The switching task is distributed across the entire network and is shared between the central node and the customer terminals. The entire network then operates as a single switch.

It will be understood that the numerical values quoted in the above paragraph are by way of example only, and that other combinations of numbers of wavelength channels, time-slots, waveguide buses, power budget and customer base are possible.

In a second embodiment shown in FIG. 3, active switching is eliminated entirely from the network, with routing being carried out solely on the basis of wavelength and time-channel selection by the customer terminals or intermediate network stations. The node in this network connecting the different TONs is a passive wavelength-division multiplexing device.

The following analysis is in terms of the single-sided routing node of FIG. 3. The number of TON ports on the multiplexer, n, depends on the total network customer base, N, and the upstream split m of each TON. This in turn depends on the aggregate bit-rate of operation, B, of each wavelength channel. The number of wavelengths needed to connect from any TON to any other is n, the number of ports. This number of wavelength channels is needed to route any level of traffic, no matter how small, simultaneously to all of the TONs. But there are two further criteria which must also be met. Firstly, a proportion of the traffic from an individual TON will wish to remain within the same geographical area. This may be 30–70% in a telephony network. But there is only one wavelength that can couple back to the same fibre within the multiplexer, which is nowhere near enough to retain such a high proportion of traffic. A set of dummy ports is added to the multiplexer. Each additional port may be used to provide an additional wavelength from a TON back to itself using a simple reflection. Secondary, further dummy ports may also be used to provide the same function between different TONs, to provide instant reconfiguration of capacity between TONs, with small increments of traffic. In this case, dummy ports convert from an incoming wavelength from a TON to a different output wavelength. This conversion allows as many wavelength channels as required to be coupled back to the same TON, each via a different dummy port. Wavelength conversion could be achieved by the use of wavelength converters, in the form of advanced all-optical devices. Suitable devices include a saturable absorber in combination with a DFB laser (which may be tunable) or with a multiple grating-cavity laser array, or a semiconductor optical amplifier (SOA) arranged to provide four-wave mixing (FWM) or simply by using the equivalent of a customer terminal to select a wavelength channel, opto-electronically convert the signal, and re-transmit at a new wavelength. Additional ports would be statistically shared across the entire network, to minimise the number of wavelength conversions required.

Figure 4:
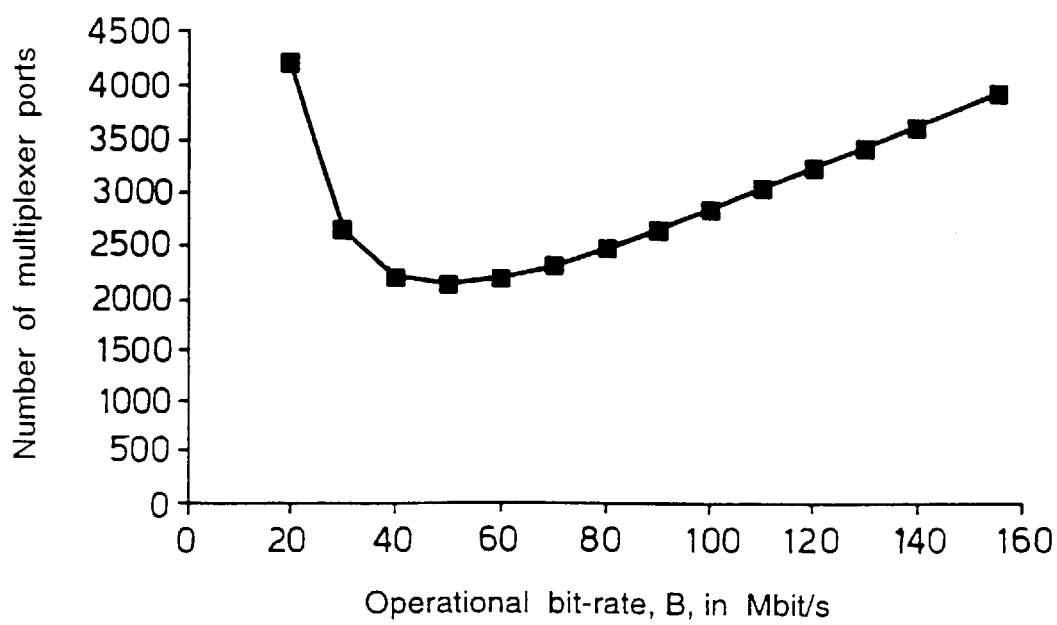
FIG. 4 is graph showing the total number of multiplexer ports as a function of the operational bit-rate and the network of FIG. 3.

Table 2 shows the number of ports required on the multiplexer for N=20,000,000 customers, using the previous results for upstream TON split m, as a function of the operational bit-rate B. The number of dummy ports is given by $$d = \frac{pmb}{B} \tag{1}$$

where b is an assumed 4.8 Mbit/s customer bit-rate, likely to be sufficient for high-quality compressed video. p is the total proportion of traffic at this bit-rate that either wishes to remain within the TON, or to be coupled to one other TON and is taken as 50%. There is no concentration assumed at this bit-rate. With these extremely generous traffic assumptions, there is evidently a minimum number of multiplexer ports of 2,142 at an optimum operational bit-rate of 50 Mbit/s (see FIG. 4). This corresponds to an upstream split of 13,430 customers. Thus each upstream TON port must support a minimum of 2,142 different wavelength channels.

Also shown in Table 2 is the corresponding total network capacity; 160 Tbit/s at 50 Mbit/s operational bit-rate. Operation at higher bit-rate would be desirable, particularly to satisfy the higher-speed data requirements of business customers. It would also provide even greater potential network capacities for greater degrees of future-proofing. If non-linearities and noise accumulation were to allow operation at 155 Mbit/s, a formidable 2,351 Tbit/s would be available for long-term capacity growth (i.e. 20,000,000 customers each with 118 Mbit/s simultaneous capacity). But further studies are needed to determine the maximum operational bit-rate that could be supported transparently across the network, with so may wavelength channels. If the method for increasing TON split size described earlier i.e. the use of gating in each wavelength channel used in combination with a passive wavelength-routing node, it is possible to achieve a given net capacity (switched through put) with fewer wavelength channels and fewer PWRN ports.

The passive wavelength multiplexer performing the wavelength routing function between transparent optical networks is in principle a very simple device (see FIG. 5). It must be larger than existing grating-based wavelength-division-multiplexers, which have been constructed with channel spacings around 1 nm [7], but would be similar to commercial optical spectrographs and monochromators found in any physics laboratory. It could consist of a curved mirror (e.g. parabolic or spherical) or a lens, diffraction grating and a linear array of fibres and partially collimating microlenses. The array of fibres and microlenses could alternatively be a waveguide array using planar, e.g. silica on silicon, technology.

An n×n device might use two arrays of monomode fibres of n fibres each, where n, for example, may be equal to 32. Each array is produced, e.g., by fixing the fibres into corresponding V-shaped grooves which are etched into silicon through an electron beam written mask. The silicon grooves may have a pitch, for example, of 128 microns. Each array of fibres is terminated by a microlens array. This is fabricated by patterning a layer of photoresist formed on the glass substrate into cylindrical islands. The substrate is subsequently heated causing the photoresist cylinders to melt and form spherical surfaces under surface tension. This array is then aligned and bonded to the front face of the fibre array. A silica tube may be used to provide a low thermal expansions support for the fibre/microlens arrays and for the output lens.

Alternative designs of multiplexer may use a single spherical grating for both imaging and dispersion. The grating may be written holographically.

The passive multiplexer device would be used in a far more powerful way than is conventionally employed for wavelength multiplexing. Instead of just combining light from a number of input fibres into a single output fibre (1×n connectivity), the device couples light from all input fibres to all other fibres (n×n connectivity). Its capacity as a simple multiplexer is multiplied by the number of fibre ports. As already discussed this can lead to quite enormous throughput in a simple device.

However, the detailed optical design of the multiplexer is such as to provide high wavelength resolution. The coupling efficiency between waveguides need not be very efficient, since optical amplifiers can compensate for the losses. Furthermore, recent multiplexer designs employing microlenses attached to the fibre ends ease the aberration requirements [7,8]. With only one device required for an entire national network, relatively large resources could be spent on additional aberration-correcting optics, if necessary.

As an alternative to the use of a single wavelength multiplexing device, the function of a wavelength-routing node could be performed by interconnecting a set of smaller wavelength multiplexers, each with relaxed performance requirements.

Figure 9:
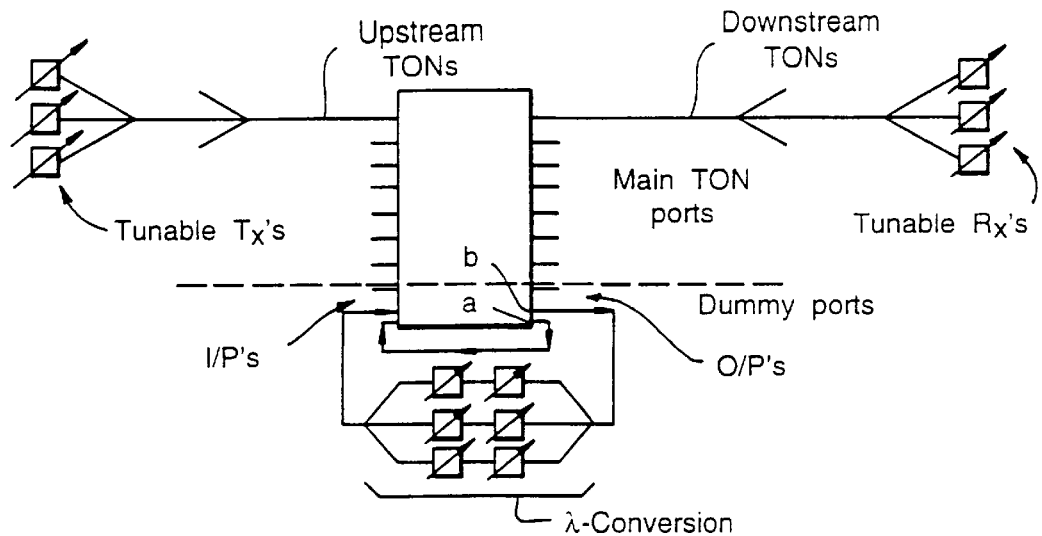
FIG. 9 shows a suitable switch network employing wavelength routing between terminals through a two-sided passive wavelength routing node.

FIG. 9 shows a switch network employing wavelength routing between terminals through a two-sided passive wavelength routing node. The multiplexer is n×n double-sided device which has in addition to main TON ports dummy ports of two types. Type a dummy ports provide additional wavelength channels to the same downstream TON as the upstream TON. Type b dummy ports provide additional wavelength channels to different downstream TONs from an upstream TON. Wavelength conversion may be affected either by tunable RXs and TXs or by wavelength conversion devices as discussed above.

Figure 10A:
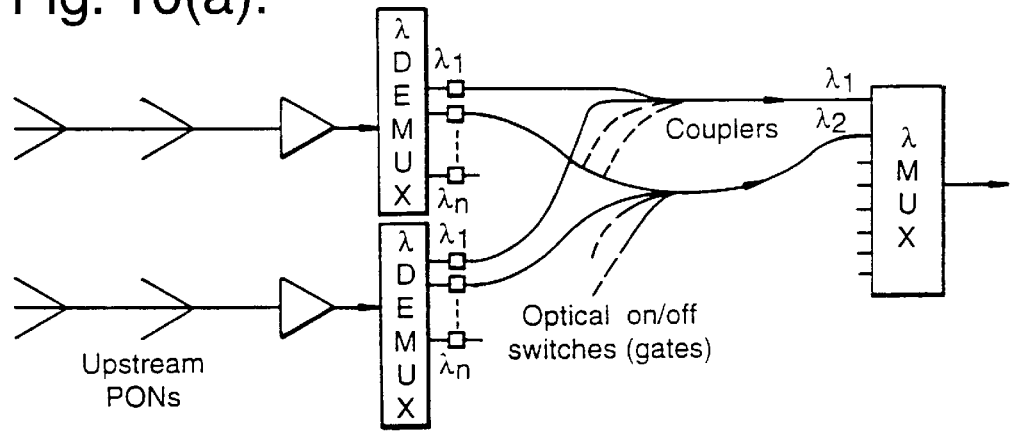
FIGS. 10$a$ and 10$b$ illustrate designs for gating wavelength channels to increase the PON split.
Figure 10B:
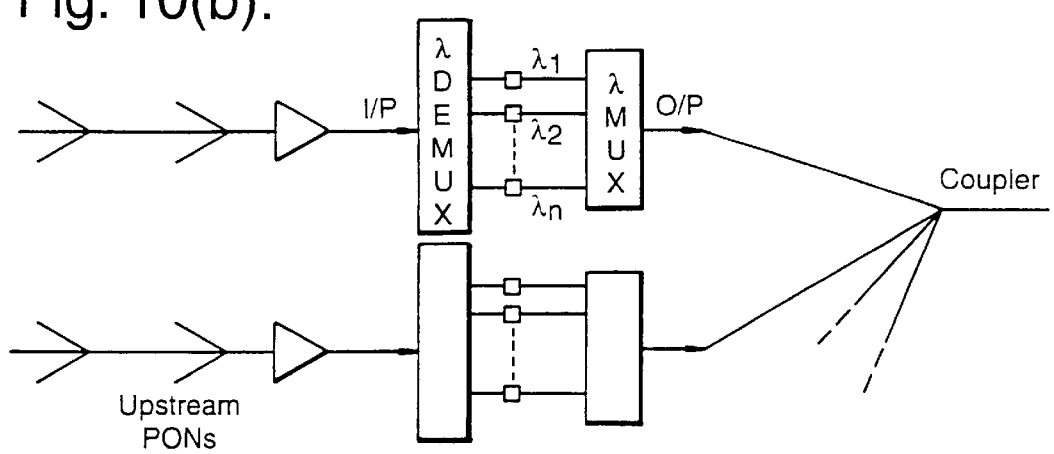
Figure 11A:
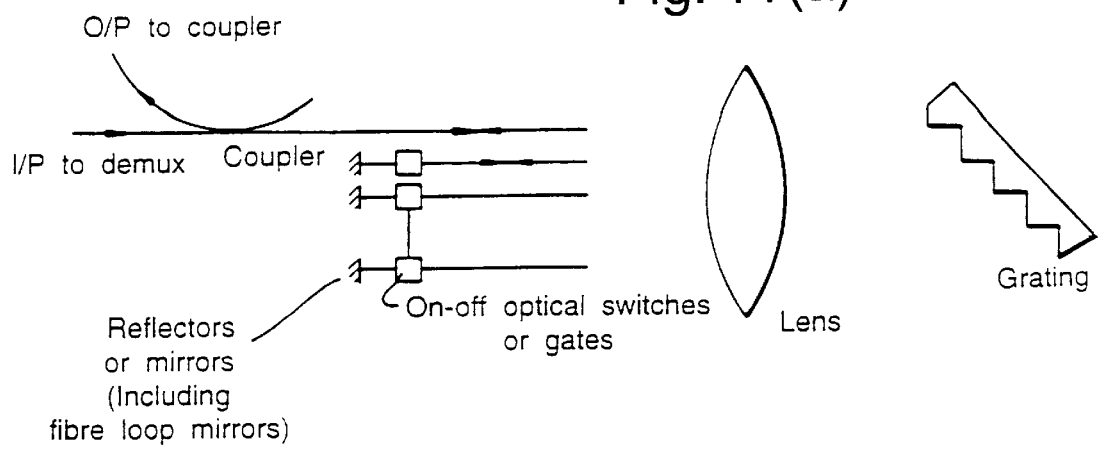
FIGS. 11$a$ to 11$c$ (ii) are schematics of systems employing different degrees of integration of wavelength demultiplexing, gating and re-multiplexing.
Figure 11B:
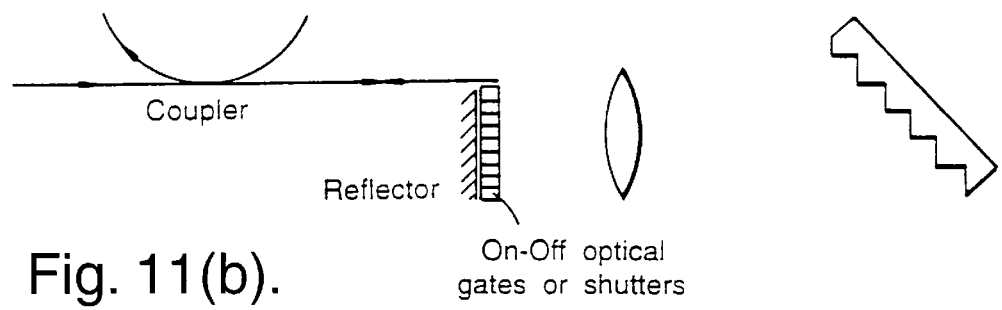
Figure 11:
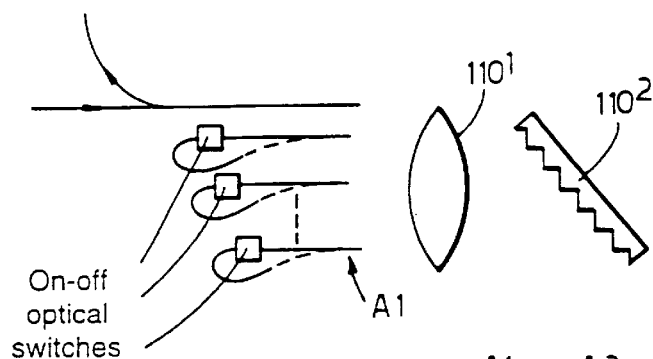

FIGS. 10a and 10b show designs for gating every wavelength channel to obtain larger upstream PON splits. FIG. 10a combines PONs at each wavelength before re-multiplexing and 10b re-multiplexes wavelengths before combining PONs. In FIG. 11c (i) a first fibre array A1 in the plane of the paper is connected by looped-back connections to a second array A2 behind the array A1, that is to say parallel to but out of the plane of the paper in 11c (i). The rest of the device comprises a lens 1101 and a reflection diffraction grating 1102. 11c (ii) is an end view of the two arrays A1, A2 showing the cross-connection affected by the device. FIGS. 11a, b and c illustrate different possible degrees of integration of wavelength demultiplexing, gating and re-multiplexing.

TABLE 1

Possible design parameters for a single 13 Tbit/s broadband switch for the UK, using 3-D spatial light modulators (SLM's) in a rearrangeable switching network structure. The capacity is equivalent to ~120 160 Gbit/s throughput ATM switches

| | |
|---|---|
| No. of customers | 26,000,000 |
| No. of simultaneous 5 Mbit/s broadband connections (10:1 concentration) | 2,600,000 |
| Customer ONU bit-rate | 300 Mbit/s |
| Time-sharing factor (eg no. of time slots) | 60 |
| No. of wavelengths | 208 |
| No. of buses | 208 |
| No. of space/wavelength channels | 43,264 |
| Shutter array size | 208 × 208 |
| No. of 3-D SLM optical switches | 15 |

TABLE 2

Number of multiplexer ports and total network capacity, as a function of operational bit-rate, for a broadband national network employing wavelength-routeing techniques directly between 20 million customer terminals.

| Bit-rate in Mbit/s | PON split | No. of TON mux ports, n | No. of dummy mux ports, d | Total No. of mux ports | Total Network Capacity Tbit/s |
|---|---|---|---|---|---|
| 155.6 | 5199 | 3847 | 81 | 3928 | 2351 |
| 140 | 5678 | 3522 | 99 | 3621 | 1786 |
| 130 | 6041 | 3311 | 113 | 3424 | 1474 |
| 120 | 6459 | 3096 | 131 | 3227 | 1199 |
| 110 | 6946 | 2879 | 153 | 3033 | 960.5 |
| 100 | 7523 | 2659 | 183 | 2841 | 755.4 |
| 90 | 8215 | 2434 | 222 | 2656 | 582.0 |
| 80 | 9066 | 2206 | 275 | 2481 | 438.0 |
| 70 | 10136 | 1973 | 352 | 2325 | 321.1 |
| 60 | 11531 | 1734 | 467 | 2201 | 229.1 |
| 50 | 13430 | 1489 | 653 | 2142 | 159.5 |
| 40 | 16184 | 1236 | 983 | 2219 | 109.7 |
| 30 | 20586 | 972 | 1667 | 2639 | 76.9 |
| 20 | 28893 | 692 | 3510 | 4202 | 58.2 |
| 10 | 51581 | 388 | 12533 | 12920 | 50.1 |
| 4.86 | 94307 | 212 | 47154 | 47366 | 48.8 |

TABLE 3

SPECIFICATION FOR FIG. 7 NETWORK

200 × 200 Port PWRN
22 Dummy Ports
10 GHz Channel Spacing
1,000-Way PON Split
178,00 Customers
155 Mbit/s per Customer
= 2.8 Tbit/s Guaranteed Switched Throughput
= 28 Tbit/s Switched Throughput for Uniform Traffic

TABLE 4

PARAMETERS FOR FIG. 1

Customer bit-rate
b = 4.8 Mbit/sec
3.6 dB loss per 2-way split
Parameters for n = 1
2.488 Gbit/s rate
0 dBm launch power
−34 dBm amplifier 1/P
7 dB noise figure
2.1 dB for 3 km fibre
512-way split

REFERENCES

1. J. R. Stern et al, "A passive optical network for telephony," Proc. ECOC September 1988, Brighton, England.
2. D. S. Forrester et al, "39.81 Gbit/s, 43.8 million-way WDM broadcast network with 527 km range," Electron. Letts., vol.27, no. 22, 051–2052 (1991).
3. P. Healey et al, "Photonic switching and interconnect for future network nodes," BT Technology Journal, vol. 9, no. 4, 19–29 (1991).
4. G. R. Hill et al, "A transport network layer based on optical network elements," J. Lightwave Technol., vol. 11, no. 5/6, 667–679 (1993).
5. A. R. Chraplyvy, "Limitations on lightwave communications imposed by optical-fibre nonlinearaties," J. Lightwave Technol, vol., 8, no. 10, 1548–1557 (1990).
6. A. R. Chraplyvy and R. W. Tkach, "What is the actual capacity of single-mode fibres in amplified lightwave systems," IEEE Photonics Technology Letters, vol.5, no. 6, 666–668 (1993).
7. D. R. Wisely, "32 channel WDM multiplexer with 1 nm channel spacing and 0.7 nm bandwidth," Electron Letters, vol. 27, no. 6, 520–521 (1991).
8. G. R. Chamberlin and A. M. Hill, "Designs for high channel density single-mode wavelength-division-multiplexers," Proc. SPIE Conf. O-E/FIBRES '87, San Diego, August 1987.

What is claimed is:

1. An optical telecommunications system comprising:
   a) a plurality of transparent passive optical networks (TONs) and a common passive rounting node;
   b) each transparent passive optical network, comprising a head end and a plurality of terminals;
   c) each of the terminals including means for selecting a wavelength channel or a wavelength-and-time channel and thereby establishing a connection with a selected other one of the terminals; and
   d) each of the head ends being connected to the common passive routing node which includes at least one dummy port.

2. A system as in claim 1, in which the routing node comprises a wavelength multiplexer having a plurality of input nodes and a plurality of output nodes arranged to cross-connect the plurality of TONs which are connected to the routing node.

3. A system as in claim 1, in which at least one said dummy port of the routing node is connected to a respective wavelength converter, and in which a signal on an incoming wavelength from a TON directed to the connected said dummy port is converted to a different wavelength and coupled to a different TON.

4. A system as in claim 1, in which at least one said dummy port of the routing node is a reflecting port for coupling incoming light from a TON back to the same TON.

5. A system as in claim 3, in which the multiplexer is a double-sided device and the dummy port is an output port which is connected to the respective wavelength converter and which is connected back to an input port of the multiplexer.

6. A system as in claim 4, in which the said dummy port is connected to the wavelength converter via a splitter.

7. A system as in claim 2 including a dummy port connected by a looped-back path to an input port of the multiplexer.

8. A method of operating an optical telecommunications system as in claim 1 comprising:
   a) selecting at respective terminals wavelength channels for forming connections with selected other terminals; and
   b) at the routing node, passively routing the signal received on the selected wavelength channel and thereby directing the signal to the originating TON or to another of the plurality of TON's which are connected to the routing node, or via the dummy port back to the routing node.

9. A method as in claim 8, in which the step of passively routing the signal at the routing node is carried out by a wavelength multiplexer and in which at least some of the incoming signals at the wavelength multiplexer are connected back to one or more of the TONs via a dummy port.

10. A method as in claim 9, in which at least some of the signals directed via a dummy port are converted in wavelength.

11. A system as in claim 2, in which the multiplexer is a single-sided n-port device and in which each port is an input/output port.

12. A system as in claim 2, in which the multiplexer is a double-sided nxn port device.

13. A method as in claim 8, in which the terminals select a wavelength/time channel.

* * * * *